US010120801B2

(12) United States Patent
Deakin et al.

(10) Patent No.: US 10,120,801 B2
(45) Date of Patent: Nov. 6, 2018

(54) OBJECT CACHING FOR MOBILE DATA COMMUNICATION WITH MOBILITY MANAGEMENT

(71) Applicant: GLOBALFOUNDRIES Inc., Grand Cayman (KY)

(72) Inventors: Oliver M. Deakin, Southampton (GB); Victor S. Moore, Lake City, FL (US); Robert B. Nicholson, Southsea (GB); Colin J. Thorne, Southampton (GB)

(73) Assignee: GLOBALFOUNDRIES INC., Grand Cayman (KY)

( * ) Notice: Subject to any disclaimer, the term of this patent is extended or adjusted under 35 U.S.C. 154(b) by 344 days.

(21) Appl. No.: 14/378,118

(22) PCT Filed: Feb. 8, 2013

(86) PCT No.: PCT/EP2013/052558
§ 371 (c)(1),
(2) Date: Aug. 12, 2014

(87) PCT Pub. No.: WO2014/135443
PCT Pub. Date: Sep. 19, 2013

(65) Prior Publication Data
US 2015/0032974 A1    Jan. 29, 2015

(30) Foreign Application Priority Data
Mar. 13, 2012   (GB) .................................. 1204362.6

(51) Int. Cl.
*G06F 12/08* (2016.01)
*G06F 12/0813* (2016.01)
(Continued)

(52) U.S. Cl.
CPC ...... *G06F 12/0813* (2013.01); *G06F 12/0831* (2013.01); *H04L 67/2842* (2013.01);
(Continued)

(58) Field of Classification Search
CPC .......................... G06F 12/0831; H04W 36/08
See application file for complete search history.

(56) References Cited

U.S. PATENT DOCUMENTS

| 6,535,509 B2 * | 3/2003 | Amicangioli ..... G06F 17/30902 370/389 |
| 6,721,288 B1 | 4/2004 | King et al. |

(Continued)

FOREIGN PATENT DOCUMENTS

| CN | 101682566 A | 3/2010 |
| EP | 1039721 | 3/2004 |

(Continued)

OTHER PUBLICATIONS

Lai et al., "Supporting User Mobility Through Cache Relocation," Mobile Information Systems, 2005, pp. 275-307.
(Continued)

*Primary Examiner* — Charles Rones
*Assistant Examiner* — Tian-Pong Chang
(74) *Attorney, Agent, or Firm* — Anthony Canale; Andrew M. Calderon; Roberts Mlotkowski Safran Cole & Calderon, P.C.

(57) ABSTRACT

Method and system are provided for object caching with mobility management for mobile data communication. The method may include: intercepting and snooping data communications at a base station between a user equipment and a content server without terminating communications; implementing object caching at the base station using snooped data communications; implementing object caching at an object cache server in the network, wherein the object cache server proxies communications to the content server from the user equipment; and maintaining synchrony between an object cache at the base station and an object cache at the object cache server.

20 Claims, 11 Drawing Sheets

(51) Int. Cl.
*H04W 36/08* (2009.01)
*H04W 36/00* (2009.01)
*H04L 29/08* (2006.01)
*G06F 12/0831* (2016.01)
*H04W 88/08* (2009.01)

(52) U.S. Cl.
CPC ..... *H04L 67/2876* (2013.01); *H04W 36/0011* (2013.01); *H04W 36/08* (2013.01); *G06F 2212/171* (2013.01); *G06F 2212/621* (2013.01); *H04W 88/08* (2013.01)

(56) References Cited

U.S. PATENT DOCUMENTS

| | | | | |
|---|---|---|---|---|
| 6,941,338 | B1* | 9/2005 | Madsen | G06F 17/30902 370/336 |
| 7,080,158 | B1* | 7/2006 | Squire | H04L 67/2814 370/389 |
| 7,143,169 | B1* | 11/2006 | Champagne | H04L 69/16 709/226 |
| 7,813,484 | B2* | 10/2010 | Jackson | H04L 12/587 379/88.13 |
| 2002/0052884 | A1* | 5/2002 | Farber | G06F 17/30091 |
| 2005/0135357 | A1* | 6/2005 | Riegel | H04L 45/583 370/389 |
| 2007/0245090 | A1* | 10/2007 | King | G06F 12/0813 711/129 |
| 2008/0086594 | A1* | 4/2008 | Chang | G06F 9/3824 711/118 |
| 2008/0153460 | A1* | 6/2008 | Chan | H04W 4/12 455/412.1 |
| 2008/0229021 | A1* | 9/2008 | Plamondon | H04L 67/2847 711/125 |
| 2008/0310365 | A1 | 12/2008 | Ergen et al. | |
| 2009/0291696 | A1 | 11/2009 | Cortes et al. | |
| 2009/0327412 | A1* | 12/2009 | Lepeska | H04L 67/101 709/203 |
| 2010/0057883 | A1 | 3/2010 | Cao et al. | |
| 2010/0161741 | A1* | 6/2010 | Jiang | H04L 63/02 709/206 |
| 2010/0235585 | A1 | 9/2010 | Dowlatkhah | |
| 2011/0044338 | A1* | 2/2011 | Stahl | H04L 1/1607 370/392 |
| 2011/0125820 | A1 | 5/2011 | Lin | |
| 2011/0202634 | A1* | 8/2011 | Kovvali | H04L 12/14 709/219 |
| 2012/0300747 | A1* | 11/2012 | Westberg | H04W 36/0011 370/331 |
| 2013/0198274 | A1* | 8/2013 | Papakipos | H04L 51/32 709/204 |

FOREIGN PATENT DOCUMENTS

| | | |
|---|---|---|
| EP | 1928154 | 8/2010 |
| EP | 2281383 | 3/2013 |
| WO | 0116788 | 3/2001 |
| WO | 2004057437 | 7/2004 |
| WO | 2011116819 | 9/2009 |
| WO | 2010115469 | 10/2010 |
| WO | 2011091861 | 8/2011 |
| WO | 2011100518 | 8/2011 |
| WO | 2012009619 | 1/2012 |

OTHER PUBLICATIONS

Hsiao et al, "Tailoring a Dsm Simulation Environment for Edge Cache Architecture," Proceedings of the 7th Workshop on Compiler Techniques for High-Performance Computing (CTHPC'01), Mar. 15-16, 2001, 15 pages.

Nguyen et al., "An Adaptive Cache Consistency Strategy in a Disconnected Mobile Wireless Network," 2011 IEEE International Conference on Computer Science and Automation Engineering (CSAE), Issue Date: Jun. 10-12, 2011, pp. 256-260.

Lai et al., "Supporting User Mobility Through Cache Relocation," Mobile Information Systems, 2005, Abstract.

International Search Report and Written Opinion for International Application No. PCT/EP2013/052558, dated Apr. 3, 2013, 12 pages.

Search Report for GB Application No. GB1204362.6, dated Jul. 11, 2012, 8 pages.

Chinese Office Action in related Chinese Application No. 201380012617.9 dated Aug. 31, 2016, 9 pages.

\* cited by examiner

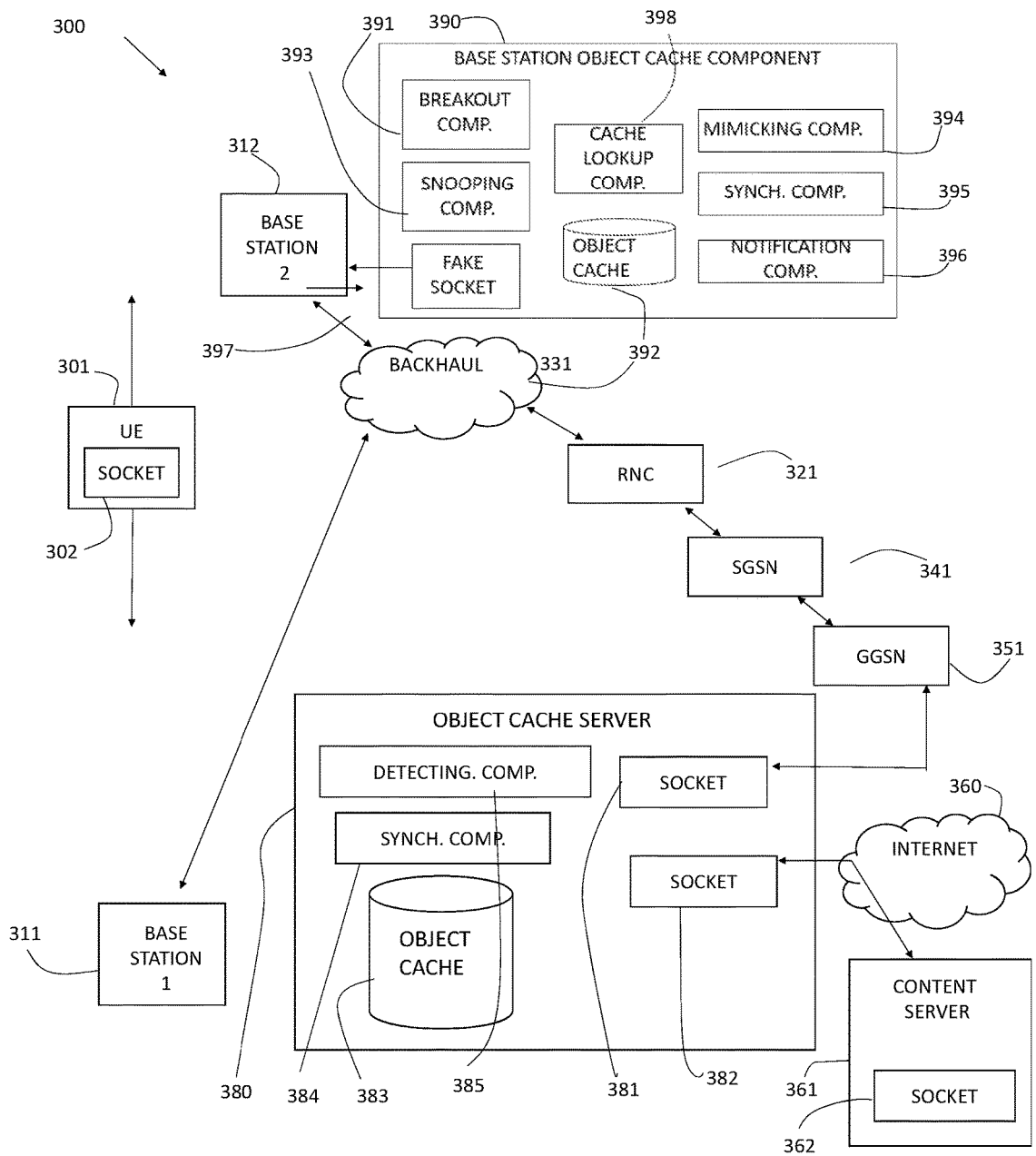

OBJECT CACHING FOR MOBILE DATA COMMUNICATION WITH MOBILITY MANAGEMENT

BACKGROUND OF THE INVENTION

This invention relates to the field of optimisation of mobile data communication with mobility management. In particular, the invention relates to Quality of Experience optimisation using object caching for mobile data communication with mobility management.

A wireless mobile data terminal (the User Equipment (UE)) communicates with a server on a connected fixed network. A mobile data terminal may be any device that can send data over a wireless network where the network provides mobility management. Examples of networks include: the GPRS (General packet radio service) (2G) network; the WCDMA (Wideband Code Division Multiple Access) (3G) network; or the LTE (Long Term Evolution) or WiMAX (Worldwide Interoperability for Microwave Access) (4G) network. The background and description of the invention are described in terms of the $3^{rd}$ Generation Mobile Phone Network, UMTS (Unified Mobile Telephony System)/WCDMA.

Referring to FIG. 1, a schematic diagram shows the UMTS architecture 100 which is standardised by the 3rd Generation Partnership Project (3GPP).

The wireless device, (cell phone, 3G dongle for a laptop, tablet device, etc.) is known in 3GPP terminology as a User Equipment (UE) 101. It connects wirelessly 110 to the base station which is labelled Base Station (BS) 102 and is known as a Node B in 3GPP terminology. Around 100 Node Bs are connected over microwave or optical fibre 120 to a Radio Network Controller (RNC) 103 which is connected back to a Serving GPRS Support Node (SGSN) 104 (which supports several RNCs) and then a Gateway GPRS Support Node (GGSN) 105. Finally the GGSN is connected back to the operators' service network (OSN) 10 which connects to the Internet 107 at a peering point.

The protocols between the base station back to the GGSN are various 3GPP specific protocols over which the IP traffic from the UE is tunnelled. Between the RNC 103 and the GGSN 105 a GPRS tunnelling protocol (GTP) 130 is used. Between the GGSN 105, OSN 106 and the Internet 107, standard Internet Protocol (IP) 140 is used. Note that the OSN 106 is termed the "Gi" reference point in the 3GPP terminology.

A key problem with communication via mobile networks is the rapid increase of data traffic. The density of mobile computing platforms is increasing at an exponential rate. Mobile computing platforms include traditional platforms such as phones, tablets and mobile broadband enabled laptops but increasingly also mobile data enabled devices, such as GPS systems, cars, even mobile medical equipment. This exponential increase brings significant new challenges for Mobile Network Operators (MNOs) as data becomes the majority of the content they deliver. Specifically although additional base stations are fairly easy to deploy to increase the available aggregate "air interface" bandwidth, the connections back from the base stations to the RNC, typically implemented as microwave links, are bandwidth constrained. Upgrading them to fibre optic connections is very expensive. Similarly increasing the available bandwidth in the RNC and core network is expensive.

The time taken to load a web page on a mobile device is typically much longer than to load the same page from a fixed connection. In part this is due to limited bandwidth and congestion in the network as described above but even if these factors are ignored, the round trip time over a mobile network is much longer than on a fixed link. Some of this increased round-trip delay time (RTT) is related to the radio interface from the UE to the base station and some is related to the connection back from the base station over microwave to the core network and the core network itself. Modifications being made to the air interface are improving the air interface latency: "evolved HSPA (High Speed Packet Access)" (sometimes informally described as 3.5G) and "Long Term Evolution" (informally described as 4G) but the latency through the microwave and core will persist.

Mobile Internet Optimisation.

One technique to address this is to "break out" the data traffic out of the mobile phone protocols and optimise it. Several companies market devices designed to break data traffic out of the network. Examples include the Mobile Data Offload (MDO) product from Stoke, Inc. and the Internet Offload appliance marketed by Continuous Computing. Each of these examples breaks traffic out of the 3GPP protocols at the RNC. Similar technology is emerging to break out the IP traffic at the base station.

Once the IP traffic has been broken out of the network, it is possible to put an optimisation platform at the edge of the mobile phone network, either at the RNC or in the base station. This platform can host various optimisation and other applications.

UMTS Mobility Management.

Referring to FIGS. 2A to 2C, a series of schematic block diagrams illustrate a network architecture 200 with mobility management as a user equipment (UE) 201 moves at the edge of the network. The figures show four base stations 211-214 named Node Bs. Sub-sets of base stations 211-212, 213-214 communicate with individual RNCs 221, 222. This communication is referred to as a backhaul link 231, 232 between the base stations and the core of the telephone company's network. The RNCs 221, 222 communicate with a SGSN 241 which uses a GGSN 251 which connects to the Internet 260 which includes multiple servers, such as the shown server 261. The server 261 has a TCP (Transmission Control Protocol) socket 262 which communicates with a TCP socket 202 at the UE 201 when a user wishes to access data from the server 261. In FIGS. 2A to 2C, the data transfer is shown in solid straight arrows, and the signalling control is shown as curved hashed arrows.

As mentioned earlier, the UMTS system makes a tunnel 270 from the GGSN 251 to the user equipment (UE) 201. In FIG. 1, the UE 201 is communicating with base station Node B 1 211 as the user is closest to this base station. The IP tunnel 270 is shown for user traffic. The IP tunnel 270 is shown for illustration purposes in FIGS. 2a to 2C and in practice passes through the interim components, such as the RNC 221 and the SGSN 241 in FIG. 2A.

As the UE 201 begins to move from one cell to the next, the RNC 221 detects movement of the UE 201 and starts a mobility event and works with the GSNs 251, 261 (GPRS Support Nodes) to move the tunnel 270 as the UE 201 moves from base station 211 to base station 212.

FIG. 2B shows the UE 201 moved to base station Node B 2 212 and the tunnel 270 moved correspondingly.

FIG. 2C shows the UE 201 moved to base station Node B 3 213 causing inter-RNC mobility as the UE 201 moves from a base stations with first RNC 1 221 to a base station with second RNC 2 222 with the tunnel 270 moved accordingly.

The key point is that the UMTS system maintains the integrity of the tunnel 270 across the mobility event. The TCP connections flowing through the tunnel 270 are not broken. It is possible that one or more IP packets may be dropped during the mobility event but TCP is designed to operate over lossy links and so this packet drop can be easily recovered.

As the UE continues to move, into an area served by a new RNC 222, the tunnel 270 is handed off seamlessly from one RNC 221 to another 222.

Traffic Optimisation Solutions Using Object Caching in the Base Station.

There are well known techniques to place a caching http forward proxy in the base station and to serve content from this. This approach achieves dramatic reductions in page load times for objects that are cached because objects can be cached taking a round trip back to the Gi or the server on the Internet. Each of these round trips can take 100 ms or more of which more than 60 ms can be saved. Since a typical page can contain tens of objects the cumulative effect of this latency is dramatic.

The problem with simply adding a caching forward http proxy at the base station is that it impacts on mobility management. The UE has a TCP connection which is terminated in the base station. If the UE moves to another base station, then it is extremely difficult to maintain a TCP connection which has state in a part of the network through which the data traffic is no longer travelling. There are some solutions in the literature which talk of forwarding traffic for these connections from the base station which the UE is using back to the base station where the TCP connection is terminated but this scheme has a number of drawbacks.

It requires an overlay network between base stations such that traffic can be forwarded from one base station to another. Management of this overlay is very difficult.

It uses up additional bandwidth to forward traffic from base station to base station and potentially increases the latency.

SUMMARY

According to a first aspect of the present invention there is provided a method for object caching with mobility management for mobile data communication, including intercepting and snooping data communications at a base station between a user equipment and a content server without terminating communications, implementing object caching at the base station using snooped data communications, implementing object caching at an object cache server in the network, where the object cache server proxies communications to the content server from the user equipment, and maintaining synchrony between an object cache at the base station and an object cache at the object cache server.

According to a second aspect of the present invention there is provided a system for object caching with mobility management for mobile data communication, including a processor, a network containing one or more base stations, where the network supports mobility management of data transfer to and from a user equipment, an object cache component at a base station for intercepting and snooping data communications between a user equipment and a content server without terminating communications, an object cache server in the network, where the object cache server proxies communications to the content server from the user equipment, and synchronising components at the base station and object cache server for maintaining synchrony between an object cache at the base station and an object cache at the object cache server.

According to a third aspect of the present invention there is provided a computer program stored on a computer readable medium and loadable into the internal memory of a digital computer, comprising software code portions, when the program is run on a computer, for performing the method of any the first aspect of the present invention.

BRIEF DESCRIPTION OF THE DRAWINGS

The present invention will now be described, by way of example only, with reference to preferred embodiments, as illustrated in the following figures:

FIG. 3 is a block diagram of a system, in accordance with a preferred embodiment of the present invention;

Figure 1:
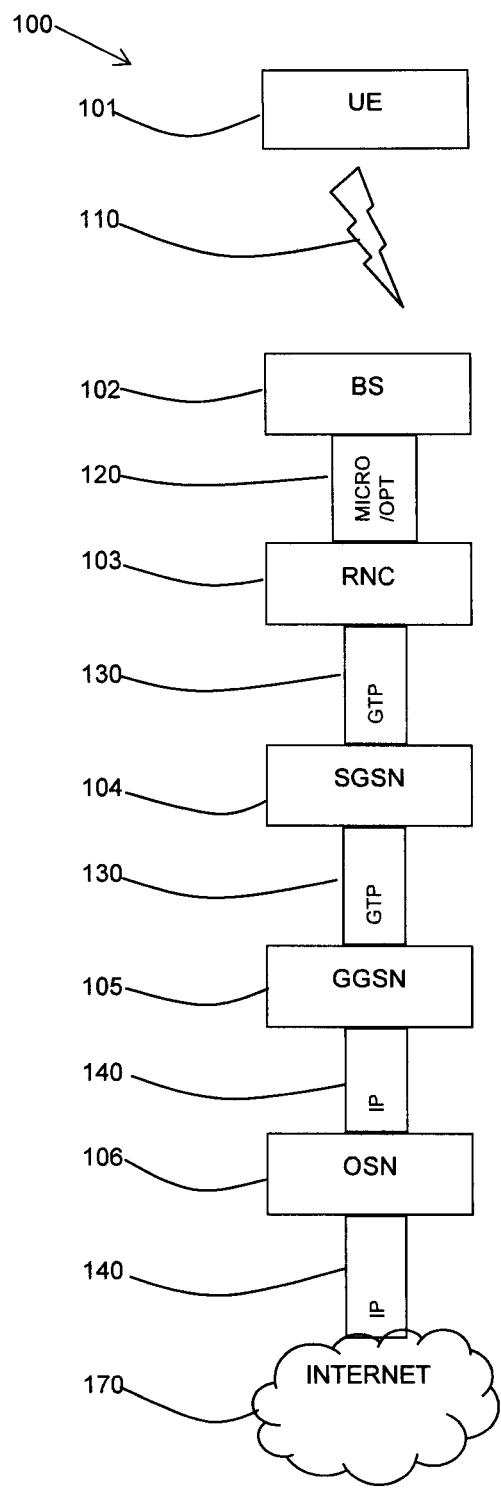
FIG. 1 is a schematic diagram showing a mobile network architecture, in accordance with the prior art, and in which a preferred embodiment of the present invention may be implemented.
Figure 2A:
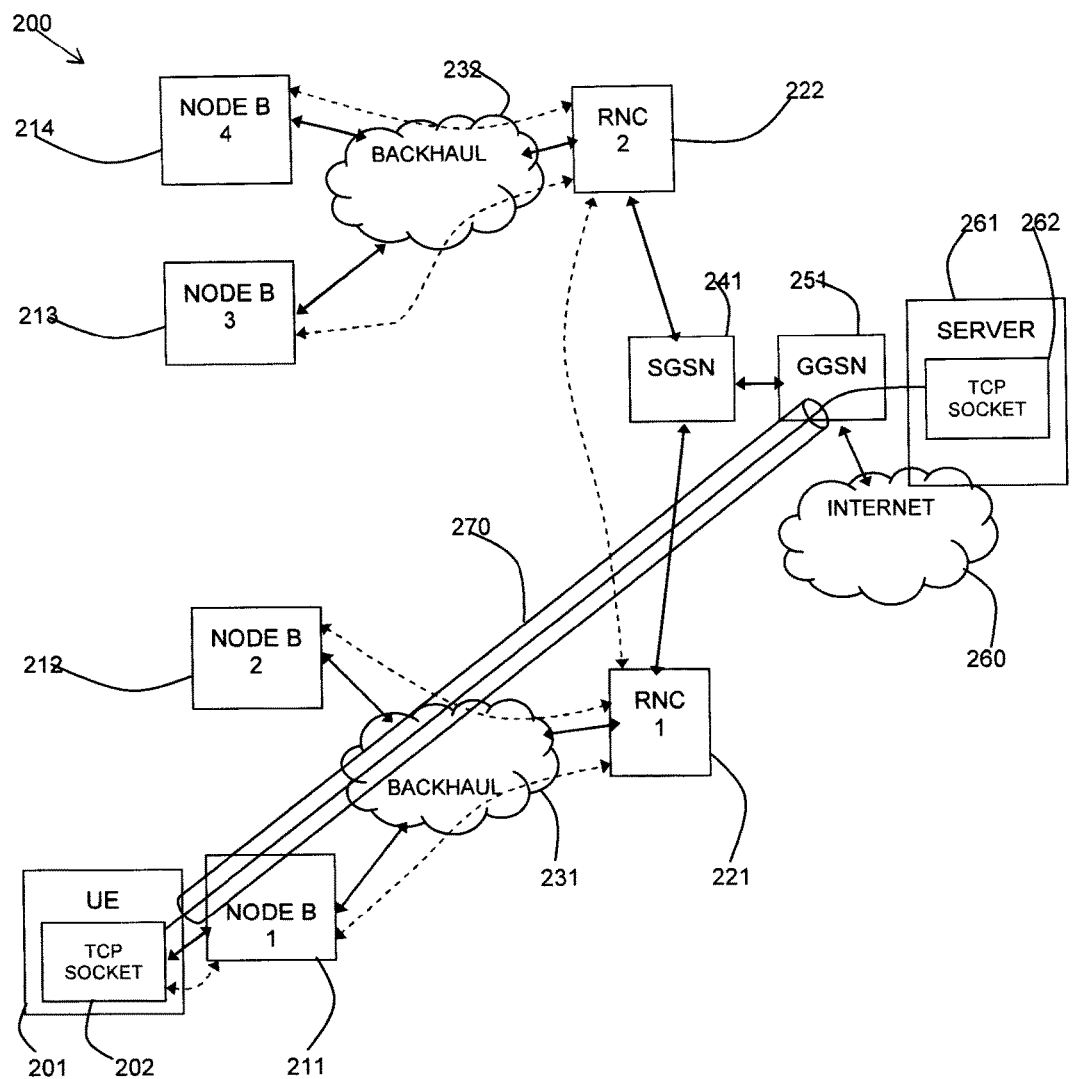
FIGS. 2A to 2C are schematic block diagrams showing mobile management across a mobile network, in accordance with the prior art, and in which a preferred embodiment of the present invention may be implemented.
Figure 2B:
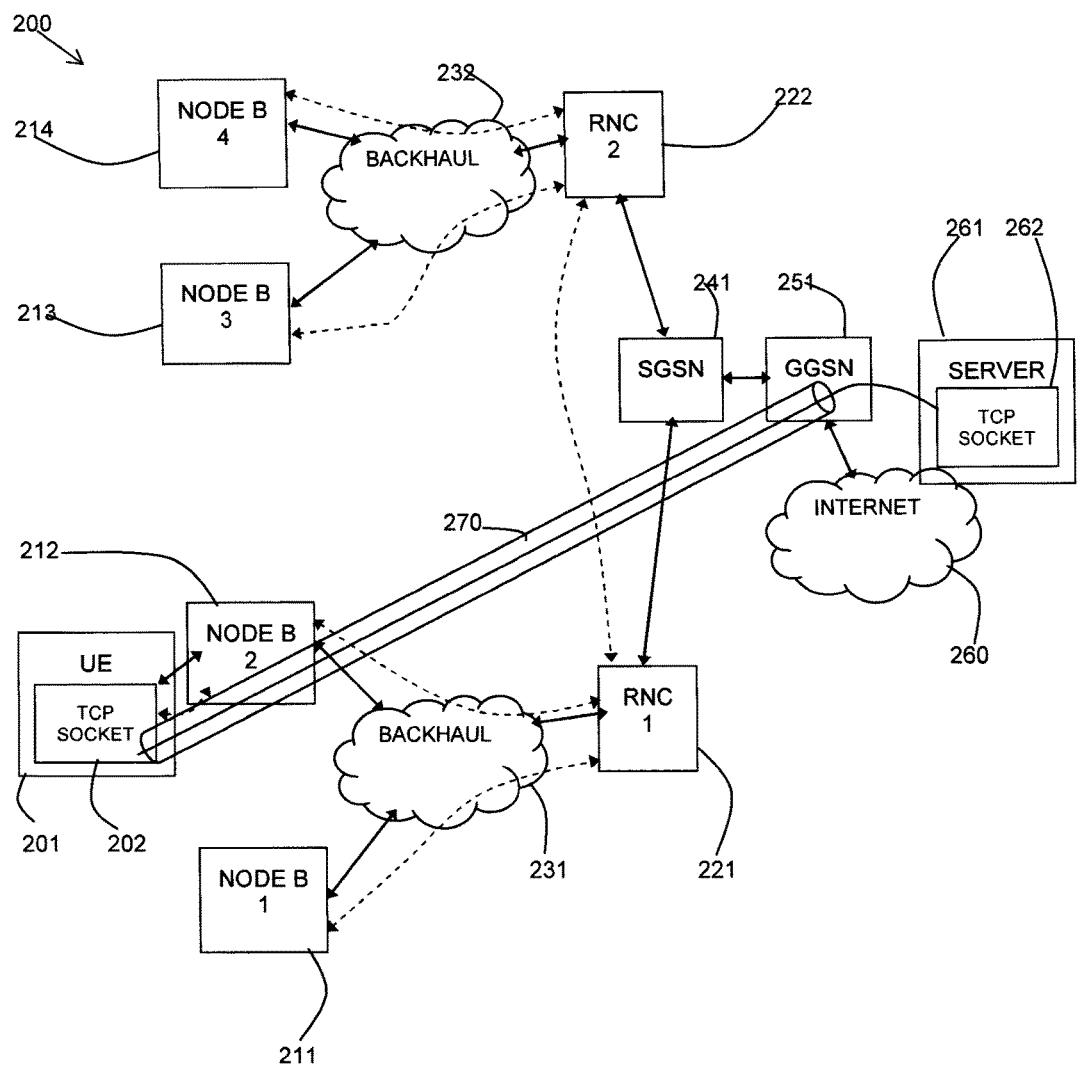
Figure 2C:
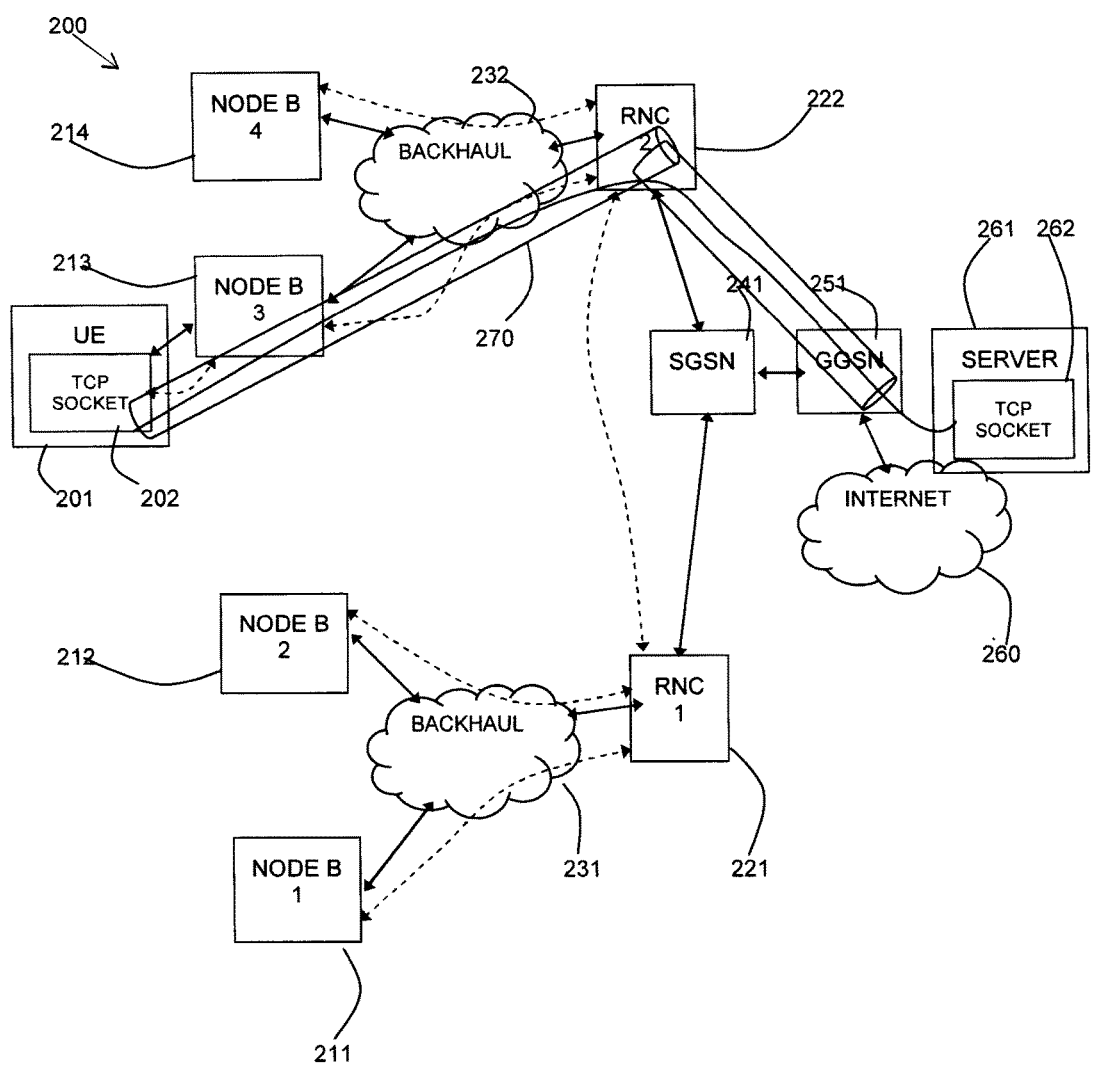

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A solution is described for reducing the latency seen when a wireless mobile data terminal (the User Equipment (UE)) fetches data objects from a server.

Reduced latency is a key goal of mobile broadband providers because it has a dramatic effect on the Quality of Service perceived by the end users. End users desire instant load of information but the reality of the current network is that it can take many 100s of milliseconds or even seconds to load a web page, even over the most recent technology.

Method and system are described for optimising communication between a wireless mobile data terminal (the User Equipment (UE)) and a server on a connected fixed network. The mobile data terminal may be any device that can send data over a wireless network where the network provides mobility management. Example networks include the GPRS (2G) network, the WCDMA (3G) network, or the LTE or WiMAX (4G) network. However, for the purposes of this description the 3G UMTS/WCDMA network will be used.

The solution is described in the embodiment of a UE fetching web objects using the HTTP (Hypertext Transfer Protocol) protocol but the concepts apply to other protocols such as FTP (File Transfer Protocol) or RTP (Real-time Transport Protocol).

The described solution presents a way to provide the same savings in latency that may be achieved by placing an object cache at the base station whilst also providing mobility. That is to say that if a UE moves to a new location whilst it is being served content from a cache in the base station, the UE continues to receive content without a break. This capability is preserved even in the event that the UE has moved to a base station which has not been modified for this solution. Additionally, this technique can be combined with byte caching which improves its ability to cache effectively.

An object caching server is inserted into the network at the reference point called the "Gi". This server is referred to as a "OCGi" (Object Cache Gi). At the Gi, traffic is no longer tunnelled. The Gi is much like a conventional WAN, it is the place where the connection is made to the peering point with the Internet. This OCGi component contains a HTTP forward caching proxy which has some additional functionality that will be described further.

Some or all of the base stations are augmented with a breakout and object cache component. The details of breakout itself are not described herein, as they are known to those skilled in the art. The breakout and object caching component at a base station is referred to as a "OCNB" (Object Cache Node B). The OCNB contains a cache but this operates slightly differently to a traditional forward caching proxy as will be described.

Referring to FIG. 3, a block diagram shows an embodiment of the described system 300.

A user equipment (UE) 301 moves at the edge of the network between multiple base stations (only two are shown in this example) 311-312 these are referred to as Node Bs in 3G terminology. The UE 301 has a transfer protocol socket 302 for data transmission to and from a socket 362 of a server 361 on the Internet 360.

The base stations 311-312 communicate with an RNC 321. This communication is referred to as a backhaul link 331 between the base stations and the core of the telephone company's network. The RNC 321 communicates with a SGSN 341 which in turn communicates with a GGSN 351.

The described system includes an object cache server 380 referred to herein as an object cache Gi (OCGI) at the point where the network connects to the peering point with the Internet 360. The object cache server 380 operates as HTTP forward caching proxy with additional functionality. The object cache server 380 includes transfer protocol sockets 381, 382, and a object cache structure 383.

The object cache server 380 may also include a synchronisation component 384 for synchronising its object cache structure 383 with that of the object cache structure 392 of the object cache component 390 of the base station 312. The object cache server 380 may also include a detecting component 385 for detecting movement of the user equipment from a base station cell and taking over serving an object of a request.

The Internet 360 provides communication with multiple content servers, such as the shown content server 361. The content server 361 has a transfer protocol socket 362.

In this embodiment, one of the base stations 312 includes an object cache component 390 referred to as an object cache Node B (OCNB) which includes breakout and object cache functionality to optimise data transfer. The object cache component 390 includes an object cache structure 392.

An embodiment of the object cache component 390 at the base station 312 includes a breakout component 391 for breaking out traffic which includes a fake socket 397 which mimics the behaviour and state of the real socket in the object cache server 380. The object cache component 390 also includes a snooping component 393 for snooping on traffic to and from the UE 301. It also includes a cache look-up component 398 for determining if a snooped request or response is cached in the object cache 392 of the base station object cache component 390. It also includes a mimicking component 394 for generating responses which mimic responses from the object cache server 380.

The object cache component 390 may also include a synchronisation component 395 for synchronising its object cache 392 with that of the object cache 383 of the object cache server 380. It may further include a notification component 396 for sending notification to the object cache server 380 of a cache hit at the object cache component 390 of the base station 312.

Figure 4:
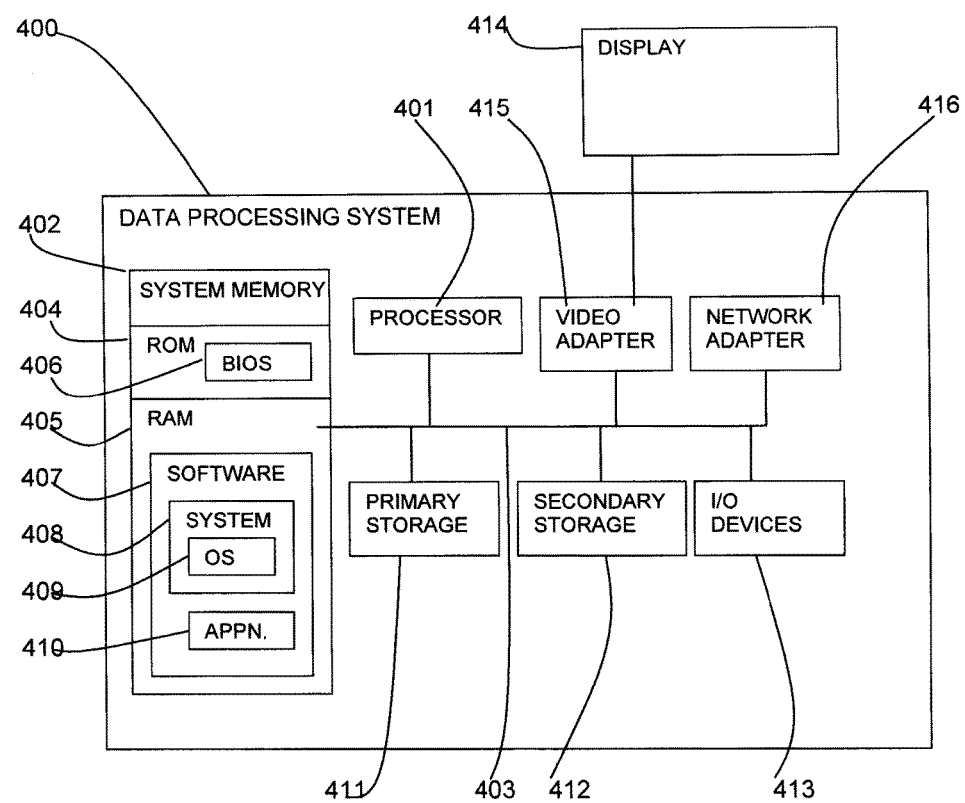
FIG. 4 is a block diagram of a computer system in which a preferred embodiment of the present invention may be implemented.

Referring to FIG. 4, an exemplary system for implementing aspects of the invention includes a data processing system 400 suitable for storing and/or executing program code including at least one processor 401 coupled directly or indirectly to memory elements through a bus system 403. The memory elements can include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including operating system software 408. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 can be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

Figure 5:
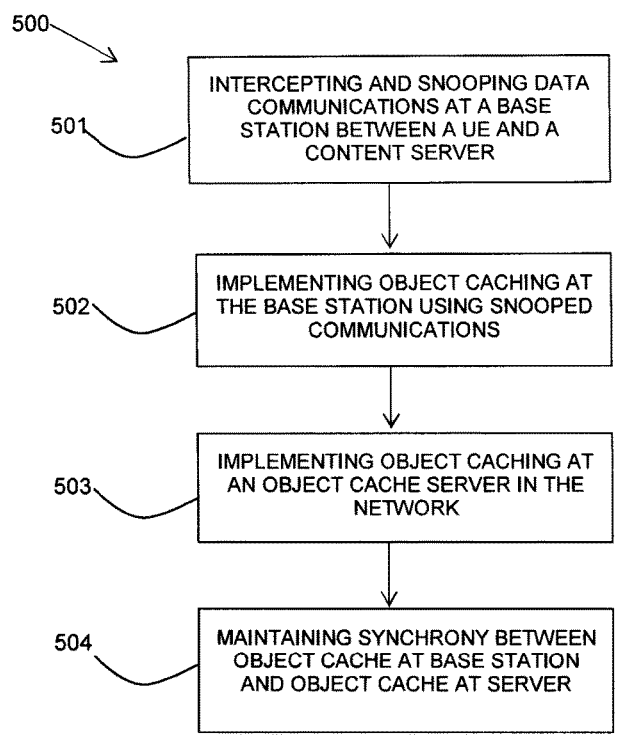
FIG. 5 is a flow diagram of an aspect of a method, in accordance with a preferred embodiment of the present invention.

Referring to FIG. 5, a flow diagram 500 shows an embodiment of the described method. The method includes intercepting and snooping 501 data communications at a base station between a user equipment and a content server on a network. Object caching is implemented 502 at the base station using snooped communications to optimize data transfer. Object caching is also implemented 503 at an object cache server provided in the network. The object cache server proxies communications to the content server from the user equipment. Synchronicity is maintained 504 between the object cache at the base station and the object cache at the server.

An example scenario is now described in order to illustrate the described solution in more detail. The example scenario is where the UE fetches a web object using the HTTP protocol in a UMTS network.

Figure 6:
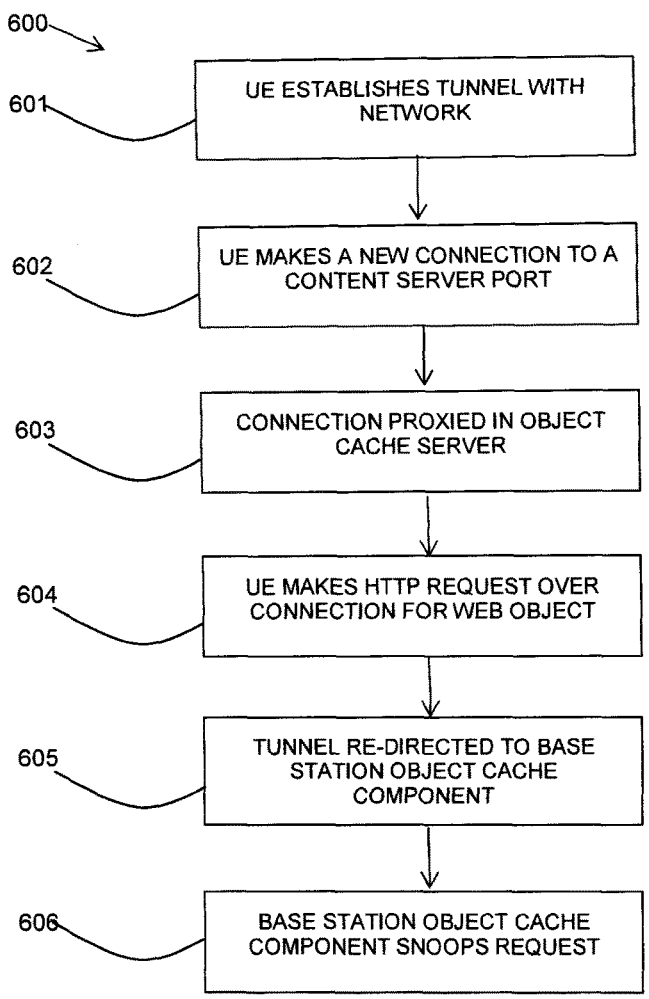
FIG. 6 is a flow diagram of an aspect of a method, in accordance with a preferred embodiment of the present invention.

Referring to FIG. 6, an example embodiment of an aspect of the method 600 is described. A UE establishes 601 a tunnel with a network. The UE and the UMTS network may set up a radio bearer and tunnel between the UE and the Gi. Note that this operation often happens in advance with the same tunnel being used over and over again for different requests.

The UE may need to make 602 a new TCP connection (over the tunnel) to the HTTP port of a content server that it wishes to fetch a web object from. This connection is proxied 603 in an OCGi.

The creation of this TCP connection involves one round trip delay on the radio network for the SYN-SYN-ACK TCP set-up phase; however, it should be noted that the HTTP protocol typically holds a single TCP connection open across many requests so it is assumed that the TCP connection will already exist in many cases and therefore there is no per request round trip.

The UE may make 604 an HTTP GET request for a web object over its TCP connection in the normal way. The tunnel carrying the TCP connection over which the HTTP GET request flows may be redirected 605 into an OCNB appliance at the base station (Node B) by a breakout function as known in the prior art.

In the OCNB appliance the TCP connection is not terminated or proxied, it is simply snooped 606. The HTTP GET request flows on through the tunnel to the core where the TCP connection is terminated in the OCGi.

Figure 7:
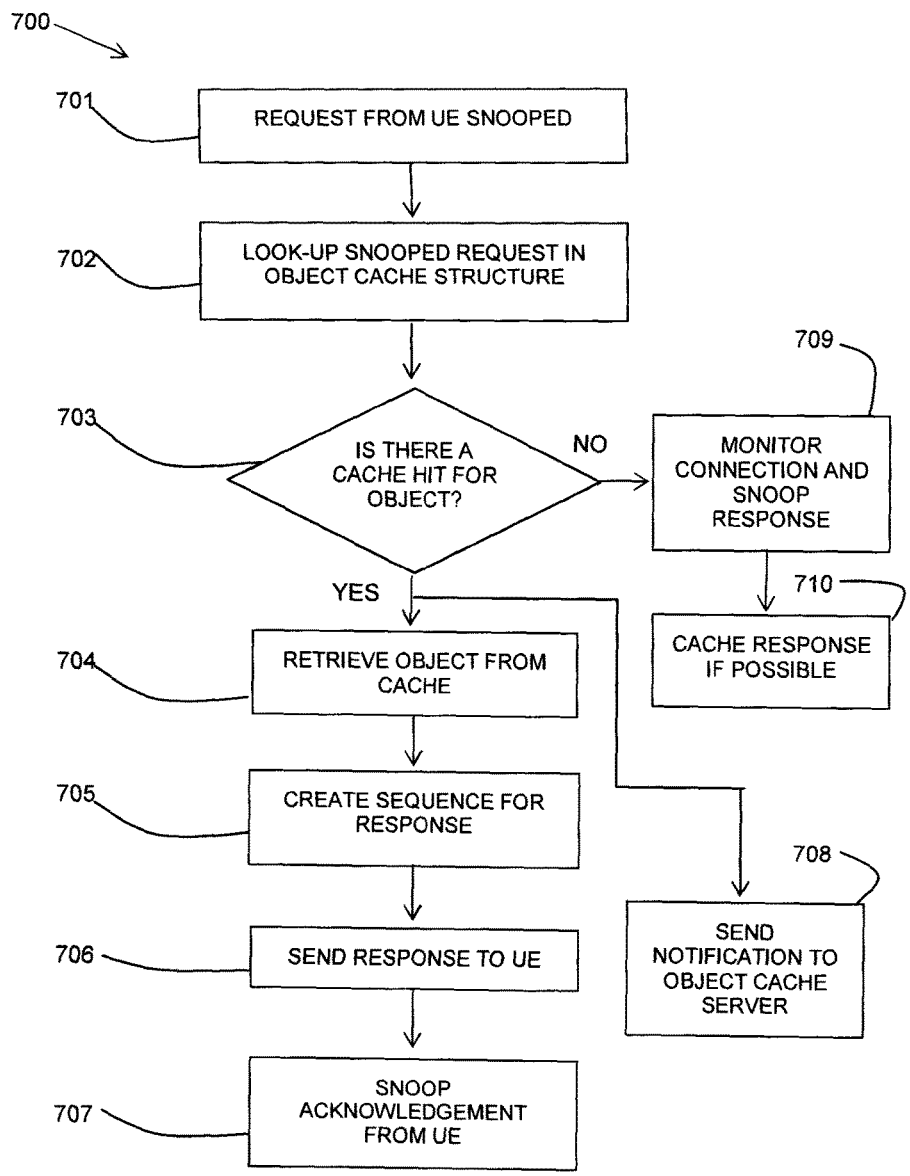
FIG. 7 is a flow diagram of an aspect of a method, in accordance with a preferred embodiment of the present invention.

Referring to FIG. 7, an example embodiment is described of an aspect of the method 700 carried out at the OCNB. The OCNB snoops 701 a request from the UE. The OCNB uses the snooped HTTP request to perform 702 a lookup in the OCNB local cache. What happens next depends on whether there is a cache hit or a cache miss 703.

If there is a cache miss in the OCNB, the OCNB continues to monitor 709 the TCP connection and snoops the response as it flows through the OCNB unchanged from the OCGi to the UE. To explain this snooping in more detail: when the response arrives, the OCNB snoops the contents of the response and examines it to determine if it is cacheable. If it is cacheable it places 710 the response into its cache as well as allowing it to flow unchanged to the UE. The determination of whether the request is cacheable includes logic to ensure that nothing is cached at the OCNB that has not also been cached at the OCGi.

A cache hit at the OCNB means that when the OCNB snooped the request it was able to determine that the OCNB has the data in its local cache necessary to serve the requested object. The scheme guarantees also that the exact same object is present in the OCGi cache. The requested object is retrieved 704 from the cache.

Furthermore, because the design of the OCNB and OCGi are synchronised, the OCNB can know precisely every detail of the HTTP response that the OCGi will send for the response. This knowledge can be precisely correct in every detail so that the OCNB is capable of creating the same sequence of bytes including all headers that the OCGi will create. Since the OCNB is also monitoring the TCP connection, it also knows the TCP state at the OCGi and can predict the TCP sequence numbers that will be used to send the response. In this way the OCNB can keep its Fake Socket synchronised with the real socket in the OCGi.

The OCNB creates 705 the response as the sequence of TCP packets that it knows the OCGi will create when the OCGi processes the request. The OCNB sends 706 the response to the UE by causing its fake TCP socket to imitate the real TCP socket in the OCGi inserting into the TCP connection in the direction towards the UE the sequence of TCP packets that will be created by the OCGi. Because the fake socket at the OCNB is kept synchronised with the real socket at the OCGi, the packets sent from the fake socket are identical in all regards to those that would be sent from the OCGi.

The OCNB can perform this task before the request has reached the OCGi. As the TCP packets flow towards the UE from the OCNB, the UE will begin acknowledging these packets with TCP ACK packets containing the sequence numbers that are being acknowledged. These ACK packets are snooped 707 by the OCNB in order to update the state of its fake socket but they are not intercepted. They flow back to the OCGi where they are used to maintain the state of the TCP socket in the OCGi, keeping this synchronised with the data transfer. This is important in case of mobility as shown below.

Note that this means that the OCGi can see acknowledgements for packets that it has yet to generate. The TCP stack at the OCGi must be modified to recognise this possibility.

When a cache hit occurs at the OCNB the OCNB sends 708 a notification to the OCGi to indicate that this is a cache hit. The notification may be sent in multiple ways. Some examples are as follows:

Modify the HTTP GET from the UE to include a notification that the content is cached. This requires the HTTP GET to be delayed for the duration of the cache lookup.

The OCNB can send an out of band message, perhaps over UDP to a well known port and IP address and this is intercepted at the OCGi. The advantage of this is that there is no need to delay the HTTP GET request.

Figure 8:
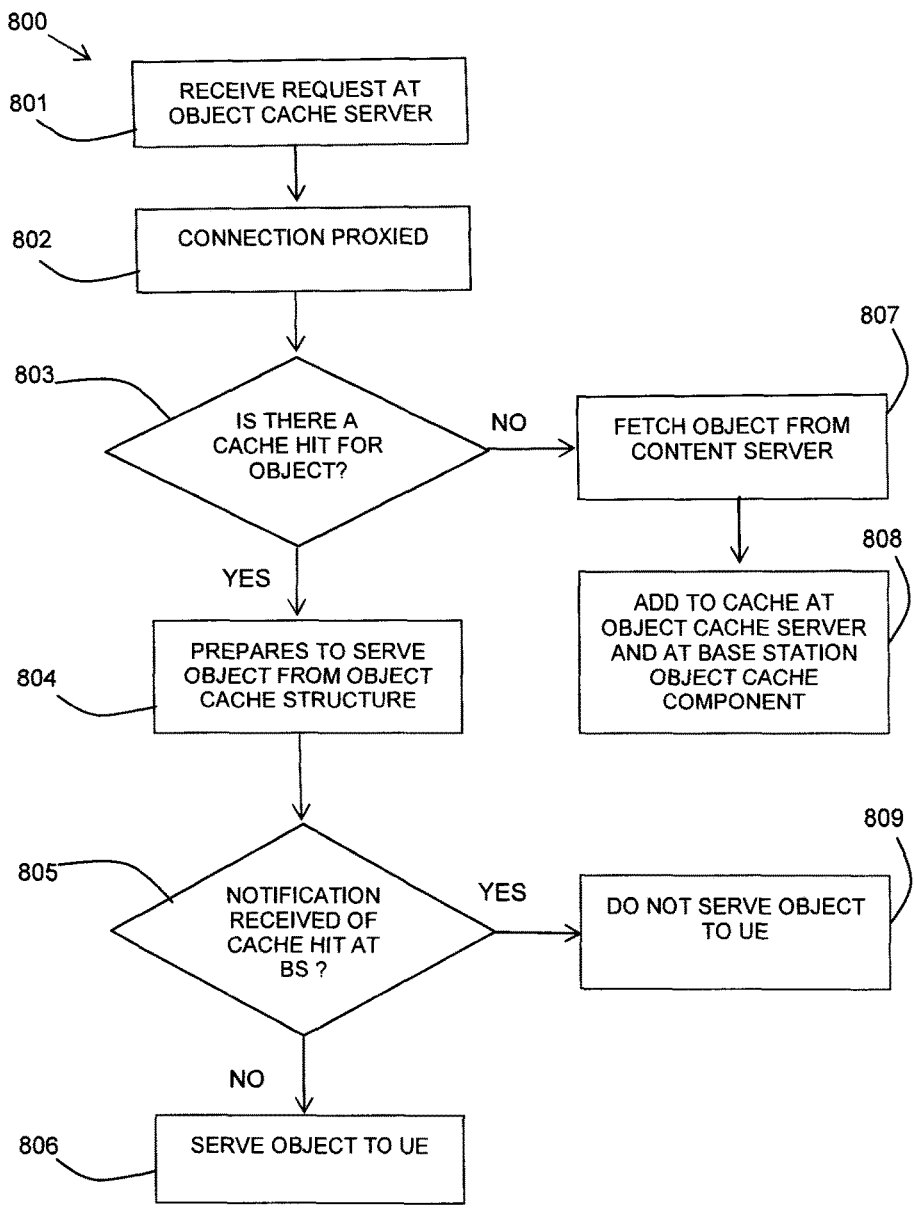
FIG. 8 is a flow diagram of an aspect of a method, in accordance with a preferred embodiment of the present invention.

Referring to FIG. 8, an example embodiment is described of an aspect of the method 800 at the core. The OCGi forward caching proxy receives 801 the request. The OCGi proxies 802 the connection and begins to process the request in the normal way for a HTTP forward caching proxy.

It is determined 803 if the requested object is in the object cache at the OCGi. If the object is in the cache and is fresh then the OCGi prepares to serve 804 the object from the cache in the OCGi.

If the object is not in the cache or not fresh, then the object is fetched 807 from the origin content server and may be later added 808 to the cache at the OCGi and OCNB. In this case, it can be guaranteed that the request is also a cache miss at the OCNB. The request is processed in the normal way that a forward caching proxy processes a cache miss.

Whilst processing a cache hit at the OCGi, the OCGi may receive 805 an indication from the OCNB that this request is a cache hit in the OCNB. If this is received, rather than serving 809 the content, the OCGi simply maintains the TCP state machine which mirrors the state of the connection. It does not send packets but it receives the ACKs for the packets that the OCNB sends on its behalf.

If the OCGi does not receive an indication from an OCNB that there has been an OCNB cache hit, then the OCGi starts serving 806 the object. There are three possible reasons for this as follows:

There is no OCNB present in the data path.
There is an OCNB in the data path but it had a cache miss.
There is an OCNB in the data path and there was a cache hit but the notification has not arrived yet. In this case OCGi will begin serving packets before it receives the indication of a cache hit in the OCNB. The OCGi may generate some packets which duplicate the packets generated at the OCNB. Both of these will flow to the UE but this is not a problem. TCP allows for duplicate packets so long as they are the same. Eventually the OCGi will receive notification and will stop sending packets.

Figure 9:
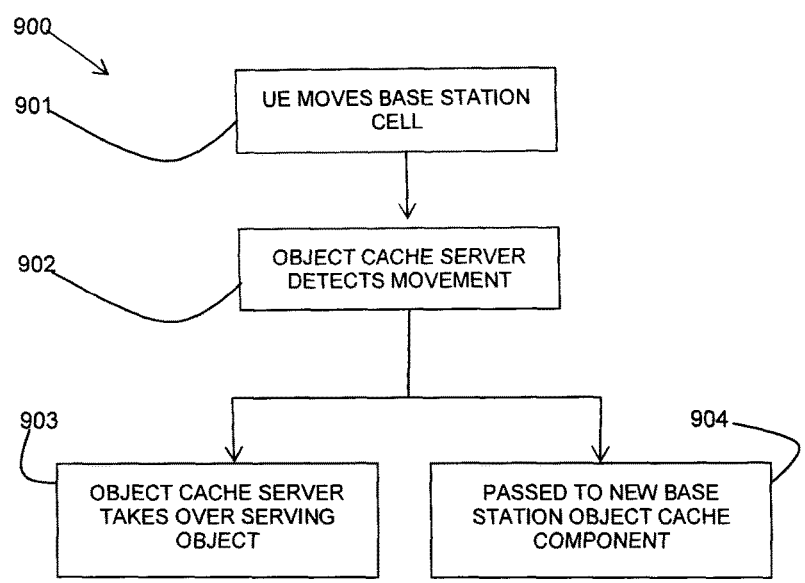
FIG. 9 is a flow diagram of an aspect of a method, in accordance with a preferred embodiment of the present invention.

Referring to FIG. 9, an example embodiment is described of an aspect of the method 900 in the form of a mobility event.

At some point in the serving of the object over TCP, the UE may move 901 to a new base station.

The OCGi may detect 902 that the UE has moved to a new base station. There are several ways this can happen. Here are three examples:

The OCGi is informed by the network.
The OCGi maintains a heartbeat with the OCNB.
The OCGi sends UDP datagrams to the UE which are removed by the OCNB. If the OCNB is not present then the UE will receive these and generate an ICMP Port Unreachable error. The OCGi notices that it has not received acknowledgement from the UE for packets that were sent and retransmits assuming no OCNB.

When the OCGi detects that the UE has moved to a new base station, the OCGi takes over 903 serving the object. It can do this because it has the up to date state of the TCP connection. It simply needs to start sending packets at the point where the OCNB stopped sending them.

Optionally, if the UE moved to a new base station which has a OCNB, then the OCGi may communicate out of band with the OCNB to arrange for the new OCNB to take over 904 the serving of the object. To do this it will be necessary to communicate the details of the original request together with the current offset and TCP information.

Note that if the new base station has an OCNB but the object is not present in its cache then this is handled in the same way as a base station that does not have an OCNB.

Cache Consistency

A cache at a base station object cache component (an OCNB) must be consistent with the cache at the object cache server (the OCGi). This consistency is a guarantee that if an object is cached at the OCNB, the exact same object is cached at the OCGi, and that the OCGi does not need to go back to the origin content server (if the cached object is stale).

If the OCGi has a different version of the object or if it needs to go back to the origin content server to fetch the object, then there is a possibility that the sequence of TCP packets generated by the OCNB may be different to that which would be generated by the OCGi.

This consistency may be achieved by the following:
Each OCNB cache may be of a fixed size.
The cache at the OCGi may be equal to the sum of all the OCNB cache sizes.

The OCGi may partition its cache and separately manage the cached objects cached for each OCNB present in the system.

The caching logic and parameters may be the same in the OCNB and OCGi for the following:
When to cache a response;
The eviction policy when the cache size is exceeded;
When an object is deemed to be stale.

Combined Object Caching and Byte Caching

The described method and system may be combined with a byte caching process between a base station and the Gi.

Byte caching may be implemented between a central interception server in the Gi and a set of interception functions in a subset of the base stations. The implementation intercepts but does not terminate transfer protocol connections. It optimises transfer protocol connections when they flow through a base station which has the optimisation function. If the UE moves to another base station which has the optimisation function then optimisation continues. If the UE moves to a base station that does not have the optimisation function then the transfer protocol connection is not affected but is not optimised.

A byte caching server may be inserted into the UMTS network at the reference point called the "Gi". This server may be referred to as a "BCGi" (Byte Cache Gi) and may be combined with the described object cache server (the OCGi). This BCGi component operates as a conventional transparent TCP proxy but has additional byte caching behaviour.

A byte cache component (referred to as a "BCNB" (Byte Cache Node B)) may be provided at one or more of the base stations which may be combined with the described base station object cache component (the OCNB). In common with the OCNB function described above, as far as the user plane data is concerned, the BCNB function operates as a "bump in the wire". It is not a proxy. In common with the OCNB, the transfer protocol connection between the UE and the core is not terminated but it is sometimes manipulated by the BCNB as if it were terminating it.

A UE may establish a tunnel with the network in the normal way. It makes a TCP connection to a port at a content server it wishes to receive data from. This TCP connection may be transparently proxied by the BCGi. The response from the server port may flow back through the proxy and may be propagated back to the UE. The BCGi does not alter the TCP stream at all but does begin examining the data, calculating Rabin fingerprints and storing away chunks of the file in the byte cache together keyed on their SHA1 hash. The byte caching is not fully described here because it is well described in the prior art references. Suffice to say that the BCGi starts to populate a standard byte cache structure but does nothing more until the UE moves to a base station with a BCNB function.

A BCNB may signal to the BCGi that it is present in the data path by generating marker IP packets which would not be generated by the UE and which the BCGi intercepts. When the BCGi recognises that a BCNB is present in the data path, the BCGi may stop sending normal TCP traffic and may start instead to send "Byte Caching Records" (BCRs) for this traffic to the BCNB. To be precise, these records are sent through the GTP tunnel as if they were to be sent to the UE but they are not sent inside the TCP connection. Instead they are sent over UDP to a port that the BCGi recognises. There are in fact many ways that these records could be sent, UDP to a special port is one example.

The BCRs may contain:

All the TCP metadata to allow the TCP packets to which they relate to be recreated at BCGi;

The starting 32 bit sequence number from the TCP header;

A byte caching token which is essentially a key that represents a chunk of the data (typically in the region of 8K in size).

At the BCNB a fake TCP socket may be created. This fake socket behaves identically to the fake socket described for the OCNB.

The BCNB may receive the byte caching tokens from the BCGi and may use these tokens to reconstitute the original data. The details of reconstituting the original data are related to byte caching. Briefly, the byte cache at BCNB looks up the token in its cache to find the corresponding full data and reconstructs the TCP packets. What is critical is that the BCNB does not need to perform the expensive Rabin fingerprinting operations on the data, these can all be done at the BCGi. The BCNB simply accesses the data related to the token and recreates the TCP packets. The BCNB uses the data in the BCRs to reconstitute the TCP frames around the data fetched from the byte cache.

It is important to note that because the data in the TCP segments recreated from the BCRs is identical, byte for byte with the data that would have been sent by the BCGi had the BCNB not been present, the TCP state in the fake socket stays synchronised precisely with the BCGi.

Note also that there is no need for the byte caching to operate purely on a TCP segment by TCP segment basis. The BCRs can contain tokens that match several segments worth of TCP data. Indeed the byte caching boundaries do not have to fall on segment boundaries.

Combining the object caching and byte caching gives the further benefit of allowing partial cache hits. This would allow the limited size cache at the OCNB to be managed in a more efficient manner.

In this case, the OCNB cache would hold sequences of byte caching tokens keyed on the HTTP request details. The initial lookup of a HTTP request would yield a sequence of byte cache tokens.

The byte cache would sit under this and may hold the data for some or all of these tokens. In the case where the data for some of the tokens was not present in the cache then it would be fetched. It will be clear to someone skilled in the art that the process of inserting the data into the TCP stream at the OCNB is identical between a byte caching implementation and an object caching implementation. In either case, the fake socket at the node B issues the sequence of TCP packets that the real TCP socket would have produced.

The particular optimisation described is one which:

Reduces the volume of data sent over the backhaul of the Radio Access Network (RAN) and the core network Significantly reduces the round trip time seen by the UE and thus significantly reduces the time to load a web page.

Does not require any modification to the UE hardware or software nor modification to the server.

Does not Interfere with Mobility Management.

As will be appreciated by one skilled in the art, aspects of the present invention may be embodied as a system, method, computer program product or computer program. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

The invention claimed is:

1. A method for object caching with mobility management for mobile data communication, comprising:
intercepting and snooping data communications at a base station between a user equipment and a content server without terminating communications;
implementing object caching at the base station using snooped data communications;
implementing object caching at an object cache server in the network, wherein the object cache server proxies communications to the content server from the user equipment;
maintaining synchrony between an object cache at the base station and an object cache at the object cache server by monitoring a state of a connection of a Transmission Control Protocol (TCP) at the object cache server;
determining a state of the TCP at the object cache server based on monitoring the state of the connection of the TCP;
predicting sequence numbers of the TCP at the object cache server used to send a response to the user equipment based on the determining of the state of the TCP at the object cache server;
detecting, by the object cache server, a movement of the user equipment from the base station while a requested object is being served to the user equipment from a cache of the base station; and
taking over, by the object cache server, serving the requested object based on the detecting, wherein the taking over includes providing a remainder of the requested object by the object cache server.

2. The method as claimed in claim 1, further comprising:
establishing a tunnel with a network and the user equipment;
establishing a TCP connection over the tunnel to a HTTP port of a content server;
making a request for a web object over a HTTP connection; and
providing a data response to the user equipment from the base station providing a cached object, wherein the data response mimics a response from the object cache server.

3. The method as claimed in claim 2, wherein providing a data response comprises creating a sequence of bytes.

4. The method as claimed in claim 2, further comprising:
providing a notification to the object cache server in response to a cache hit being made at the base station for a data communication; and
using the snooped data communications to perform a lookup on a local cache of the base station.

5. The method as claimed in claim 1, further comprising:
in response to a cache hit at the base station for a data communication, serving the cached object to the user equipment in data packets;
snooping, by the base station, one or more acknowledgement data packets from the user equipment and allowing the acknowledgement data packets to proceed to the object cache server where they are used to maintain the state of the TCP at the object cache server; and
monitoring the TCP connection at the object cache server during the snooping.

6. The method as claimed in claim 5, further comprising:
modifying the object cache server to accommodate receiving acknowledgement data packets from the user equipment for data packets it has not generated; and
modifying a HTTP GET of the user equipment to include a notification that content is cached at the object cache server.

7. The method as claimed in claim 1, further comprising:
snooping at the base station a response from the object cache server;
caching an object of the response in response to the object being cached at the object cache server; and
modifying a HTTP GET of the user equipment to include a notification that content is cached at the object cache server.

8. The method as claimed in claim 1, further comprising:
in response to a cache hit being served from the object cache server and a notification that the base station has received a cache hit, stopping the serving of the object from the object cache server whilst maintaining the state of the TCP at the object cache server which mirrors a TCP state of the base station.

9. The method as claimed in claim 1, further comprising:
detecting a movement of the user equipment from a base station cell by the object cache server; and
taking over, by a new base station, serving an object of a request.

10. The method as claimed in claim 1, further comprising:
maintaining an object cache at each base station consistent with an object cache at the object cache server, wherein the state of the TCP at the object cache server is maintained at each base station.

11. The method as claimed in claim 10, further comprising:
providing an object cache at each base station of a fixed size;
providing an object cache at the object cache server of a size equal to the sum of all the base station object caches; and
partitioning the object cache of the object cache server to manage separately the objects cached for each base station.

12. The method as claimed in claim 10, further comprising:
providing a same caching logic and a same parameters at the base stations and at the object cache server.

13. The method as claimed in claim 1, further comprising:
implementing byte caching at the base station and at the object cache server, wherein the byte caching enables partial cache hits; and
wherein the base station holds one or more sequences of byte caching tokens keyed on data request details and maintains the state of the TCP at the base station as the same as the TCP state at the object cache server.

14. The method as claimed in claim 1, wherein the data communications are hypertext transfer protocol requests and responses.

15. A system for object caching with mobility management for mobile data communication, comprising:
a processor;
a network containing one or more base stations, wherein the network supports mobility management of data transfer to and from a user equipment;
an object cache component at a base station for intercepting and snooping data communications between the user equipment and a content server without terminating communications;
an object cache server in the network, wherein the object cache server is configured to:
proxy communications to the content server from the user equipment;
synchronize components at the base station and object cache server for maintaining synchrony between a fake TCP socket of an object cache at the base station and a real TCP socket of an object cache at the object cache server by causing the fake TCP socket of the object cache at the base station to imitate the real TCP socket of the object cache at the object cache server;
detect a movement of the user equipment from the base station while a requested object is being served to the user equipment from a cache of the base station; and
take over serving the requested object based on the detecting, wherein the taking over includes providing a remainder of the requested object by the object cache server.

16. The system as claimed in claim 15, wherein the object cache component at the base station further comprises:
a mimicking component for providing a data response to a user equipment from the base station providing a cached object, wherein the data response mimics a response from the object cache server;
a breakout component for breaking out traffic to received at the object cache component; and
the fake TCP socket which mimics a behavior and the state of the TCP of the real TCP socket of the object cache server.

17. The system as claimed in claim 15, wherein the object cache component at the base station includes a notification component for providing a notification to the object cache server in response to a cache hit being made at the base station for a data communication.

18. The system as claimed in claim 15, wherein the object cache server comprises:
a detecting component for detecting a movement of the user equipment from a base station cell and taking over, by a new base station, serving an object of a request.

19. The system as claimed in claim 15, further comprising:
an object cache at each base station of a fixed size;
an object cache at the object cache server of a size equal to the sum of all the base station object caches, wherein the object cache of the object cache server is partitioned to manage separately the objects cached for each base station.

20. A computer program product stored on a non-transitory computer readable medium and loadable into the internal memory of a digital computer, comprising software code portions, that, when executed by the computer, cause the computer to perform object caching with mobility management for mobile data communication by performing actions comprising:
intercepting and snooping data communications at a base station between a user equipment and a content server without terminating communications;
determining the snooping data communications is cacheable based on a cache hit at the base station;
implementing object caching at the base station using the snooping-data communications;
implementing object caching at an object cache server in the network, wherein the object cache server proxies communications to the content server from the user equipment;
maintaining synchrony between an object cache at the base station and an object cache at the object cache server by monitoring a state of a Transmission Control Protocol (TCP) of the object cache server; and
detecting a movement of the user equipment from the base station while a requested object is being served to the user equipment from a cache of the base station; and
taking over serving the requested object based on the detecting, wherein the taking over includes providing a remainder of the requested object by the object cache server.

* * * * *